(12) United States Patent
Rosa et al.

(10) Patent No.: US 6,263,975 B1
(45) Date of Patent: Jul. 24, 2001

(54) LAWN EDGER INCLUDING MULTI-POSITIONABLE EDGE-GUIDE

(75) Inventors: Richard Rosa, Kingston; James Marshall, Mallorytown; David Clements, Brockville, all of (CA)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 09/358,439

(22) Filed: Jul. 22, 1999

Related U.S. Application Data (60) Provisional application No. 60/133,856, filed on May 12, 1999, and provisional application No. 60/094,102, filed on Jul. 24, 1998.

(51) Int. Cl.[7] .................................................. A01D 53/14

(52) U.S. Cl. ................................................................ 172/15

(58) Field of Search ................................ 56/17.1, 17.4, 56/13.7, 15.7, 256, 11.6, 16.7; 172/13, 14, 15, 17

(56) References Cited

U.S. PATENT DOCUMENTS

| | | |
|---|---|---|
| 1,609,734 | 12/1926 | Meyers . |
| 1,644,068 | 10/1927 | McBride . |
| 2,541,284 | 2/1951 | Presswood . |
| 2,718,742 | 9/1955 | Tangeman . |
| 4,463,544 | 8/1984 | Carsello et al. . |
| 4,852,658 | 8/1989 | Wessel et al. . |
| 5,065,567 * | 11/1991 | Wessel et al. ......................... 56/13.7 |
| 5,301,757 | 4/1994 | Kelley, Jr. . |
| 5,325,928 * | 7/1994 | Wagster et al. ......................... 172/15 |
| 5,437,334 * | 8/1995 | Hirata et al. ............................ 172/15 |
| 5,826,667 * | 10/1998 | Notaras et al. ......................... 172/15 |

* cited by examiner

Primary Examiner—Robert E. Pezzuto
(74) Attorney, Agent, or Firm—Oliff & Berridge, PLC (57) ABSTRACT

A lawn edger includes an edge guide movable between a curb-edging mode and a trench mode. A lever is connected to the edge guide and extends through an aperture of a blade guard that is positioned to cover at least a portion of the cutting blade. The lever is positionable to move the edge guide between the curb-edging mode and the trench mode. When the edge guide is in the trench mode, the lever moves from a retracted position into an extended position, thereby providing a visual directional to the user.

20 Claims, 8 Drawing Sheets

FIG. 6

# LAWN EDGER INCLUDING MULTI-POSITIONABLE EDGE-GUIDE

This non-provisional application claims the benefit of U.S. Provisional Application No. 60/094,102 filed Jul. 24, 1998 and U.S. Provisional Application No. 60/133,856 filed on May 12, 1999.

BACKGROUND OF THE INVENTION

1. Field of Invention

The present invention is directed generally to lawn edger with an edge guide that provides a fixed surface that guides the lawn edger as it is moved along a curb or other suitable surface. More particularly, the present invention relates to a lawn edger with a multi-positionable edge guide movable between an edge-cutting mode and a trench mode.

2. Description of Related Art

Lawn edgers with fixed edge guides such as disclosed in U.S. Pat. Nos. 4,463,544 and 5,301,757 have limited applications. The fixed edge guide causes excess resistance with the ground and decreased maneuverability for garden bed edging or trench cutting. The fixed edge guide can also interfere with other applications such as crevice cleaning, because of its depth. Also, the fixed edge guide may not allow transport of the edger with all wheels on the ground.

Conversely, while removable edge guides provide a solution to the problems associated with the fixed guides described above, the removal process can take significant time and storage is required once the edge guide is removed. When using a lawn edger without an edge guide, it is sometimes difficult to follow a desired cutting path, particularly if there is no straight curb or surface to follow.

U.S. Pat. No. 2,718,742 discloses a lawn edger including a guide strap 56 pivotable about a bolt 58 between positions abutting first and second stop pins 60, 61. However, U.S. Pat. No. 2,718,742 does not provide any convenient means by which a user may change the position of the guide strap, any visual positional (sight-line) as to the desired cutting path, or any indication to the user as to the position of the guide strap.

SUMMARY OF THE INVENTION

One feature of the invention is directed to providing a lawn edger with a multi-positionable edge guide. In trench mode, the edge guide is out of the ground and can be positioned to provide a reference or sight-line for the user to follow. In the trench mode, because the edge guide is above ground, it does not interfere with transport of the edger or with applications such as trenching or crevice cleaning. In curb-edging mode, the edge guide can be in the ground, providing a physical directional or fixed surface that guides the edger along a curb or other suitable surface. The edge guide also serves to prevent contact between the cutting blade and the curb, which can cause damage.

By making the edge guide multi-positionable, the user need not remove it completely from the edger to perform trench cutting or to transport the edger. When it is desired or necessary to change from the curb-edging mode to the trench mode, the user can manipulate a lever in order to move, rotate or otherwise translate the edge guide. The lever can be moved or translated until the edge guide is properly positioned, whereupon the lever and/or the edge guide can be locked into position. The lever can be conveniently positioned within an aperture of a blade guard covering at least a portion of the cutting blade. Alternatively, a pin connecting the edge guide and the lever can pass through a slot shaped aperture in the blade guard, and the lever can remain behind the blade guard, opposite to where the cutting blade is positioned.

One exemplary embodiment of a lawn edger according to the invention includes a housing having a motor, a cutting blade coupled to the motor, a blade guard positioned to cover at least a portion of the cutting blade, an edge guide rotatably mounted between the housing and the cutting blade and a lever connected to the edge guide and extending through an aperture in the blade guard. The edge guide is moveable between a curb-edging mode and a trench mode, and the lever is operable to move the edge guide between the curb-edging mode and the trench mode. In this embodiment, the motor may include a rotating shaft coupled to the cutting blade and the edge guide. Also, a spindle boss may extend from the motor and rotatably mount the edge guide. The spindle boss may also include a rotating shaft coupled to the cutting blade.

In embodiments, the blade guard may include a pin member that engages with the first hole in the lever when the edge guide moves into the curb-edging mode and a second hole in the lever when the edge guide moves into the trench mode. A spring may be provided to bias the lever against a side surface of the aperture of the blade guard when the pin member engages the first or second hole of the lever. The lever may be movable between a retracted position with respect to the blade guard when the edge guide is in the curb-edging mode and an extended position with respect to the blade guard when the edge guide is in the trench mode. In the extended position, the lever can provide a visual directional aide to the user.

In another exemplary embodiment according to this invention, the lawn edger includes a housing including a motor, a cutting blade powered by a rotating shaft extending from a spindle boss of the motor, an edge guide rotatably mounted on the spindle boss of the motor, and a lever connected to the edge guide. The edge guide is movable between a curb-edging mode and a trench mode, and the lever is operable to move the edge guide between the curb-edging mode and the trench mode. In embodiments, the lawn edger may include a blade guard covering at least a portion of the cutting blade, and the blade guard may include an aperture through which the lever extends, wherein the lever is movable between a retracted position with respect to the blade guard when the edge guide is in the curb-edging mode and an extended position with respect to the blade guard when the edge guide is in the trench mode.

According to yet another exemplary embodiment according to the present invention, a lawn edger includes a housing having a motor, a cutting blade coupled to a rotating shaft extending from a spindle boss of the motor, and an edge guide rotatably mounted on the spindle boss of the motor, the edge guide being movable between a curb-edging mode and the trench mode.

Accordingly, the lawn edgers according to the exemplary embodiments are not application-limited because they can be used with or without the edge guide. In the trench mode, where the edge guide is clear of the ground, travel of the edger is facilitated. Also, the lever can provide an indication as to the position of the edge guide. In some cases, the lever can also provide a visual directional aide to the user. Trench mode operation also allows the edger to have increased maneuverability for garden bed edging or trenching.

In the curb-edging mode, where the edge guide is in the ground, the edge guide provides a physical directional aide and prevents the blade from contacting the curb or edge. The user can quickly adapt to different edging situations by moving, rotating or otherwise translating the edge guide into position, without tools and without removing the edge guide from the edger.

These and other objects and aspects of the invention will be described in and/or apparent from the following detailed description of exemplary embodiments of the lawn edger of the present invention.

BRIEF DESCRIPTION OF THE DRAWINGS

Exemplary embodiments of the invention will be described in detail with reference to the following drawings in which like reference numerals refer to like elements and wherein.

DETAILED DESCRIPTION OF PREFERRED EMBODIMENTS

Figure 1:
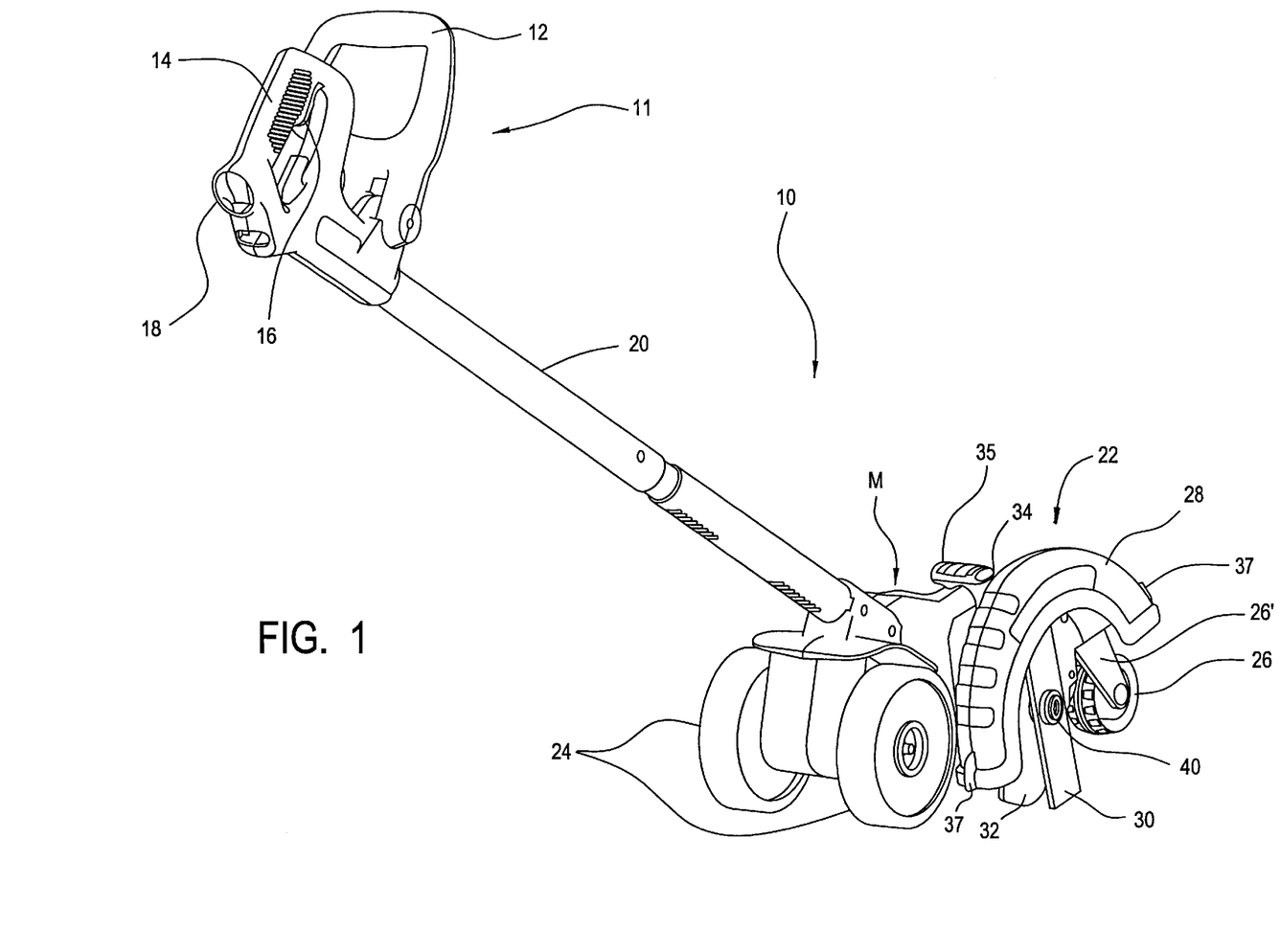
FIG. 1 is a perspective view illustrating one exemplary embodiment of a lawn edger according to the present invention.

FIG. 1 shows a lawn edger 10 according to the present invention. The lawn edger 10 includes a handle assembly 11 connected via an elongate tube 20 to a blade and motor housing 22. The handle assembly 11 includes an upper or auxiliary handle 12 and a rear handle 14. The upper and rear handles 12 and 14 may have shapes significantly different from those shown, and the upper handle 12 may be rotatable and is optional. The rear handle 14 may include a switch 16 operatively coupled to a motor M within the housing 22. A receptacle 18 is provided on the rear handle 14 for receiving an external power source, such as a power cord (not shown). Of course, the motor M can be replaced with a gasoline powered motor, or the external power source can be replaced with a self-contained power source, such as a battery pack.

A pair of rear wheels 24 and a front wheel 26 are provided adjacent the housing 22. A blade guard 28 is also positioned adjacent the housing 22 between the rear wheels 24 and the front wheel 26. The blade guard 28 can be formed as part of the housing 22 and protects a user against debris forced into motion by a cutting blade 30. The cutting blade 30 is mounted on a rotating shaft 40 that is connected to the motor M.

Also positioned at least partially within the blade guard 28 is an edge guide 32. The rotating shaft 40 protrudes through the cutting blade 30 and the edge guide 32. The edge guide 32 serves to provide a physical directional for the user as the edge guide 32 contacts the curb or another suitable surface. The edge guide 32 can also help prevent contact between the cutting blade 30 and the curb, thereby avoiding damage. A lever 34 is used for positioning the edge guide 32. The lever may include a knob 35 easily manipulable by the user. The knob 35 may have an industrial design that is shaped to assist the user in imparting proper motion to move the lever in the intended manner or direction.

Figure 2:
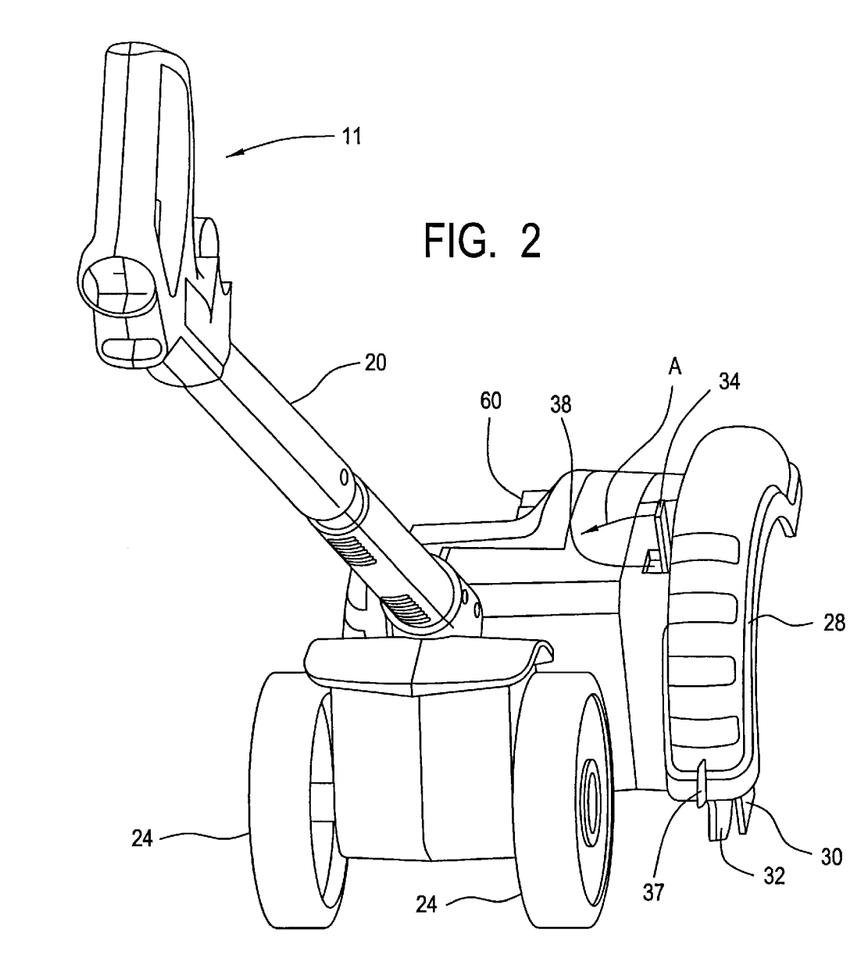
FIG. 2 is a rear perspective view of the lawn edger shown in FIG. 1.

As shown in FIG. 2, the lever 34 (shown without the knob 35 for clarity) can protrude through an aperture 38 of the blade guard 28 in order to connect with the edge guide 32. The lever 34 can be bent or moved in the direction as shown by arrow A so that the edge guide 32 can be moved between a curb-edging mode and a trench mode, as described below. The lever 34 can be biased against a side wall of the aperture 38. The resiliency of the lever 34 itself or a separate spring 39 (FIG. 2A) can be used to bias the lever 34 against the aperture sidewall. The blade guard 28 may include one or more alignment ribs, e.g., vertical cut-line ribs 37, that provide a visual indication to the user as to the position of the cutting blade 30. Additional alignment ribs can be provided on the front end of the blade guard 28. FIG. 2 shows the handle assembly without the upper handle 12, and also illustrates a depth adjustment knob 60 for adjusting the depth of the cutting blade 30. The depth adjustment knob 60 can be selectively loosened or tightened to pivot the brace 26' (FIG. 1) that supports the front wheel 26, thereby varying the cutting depth of the cutting blade 30.

Figure 2A:
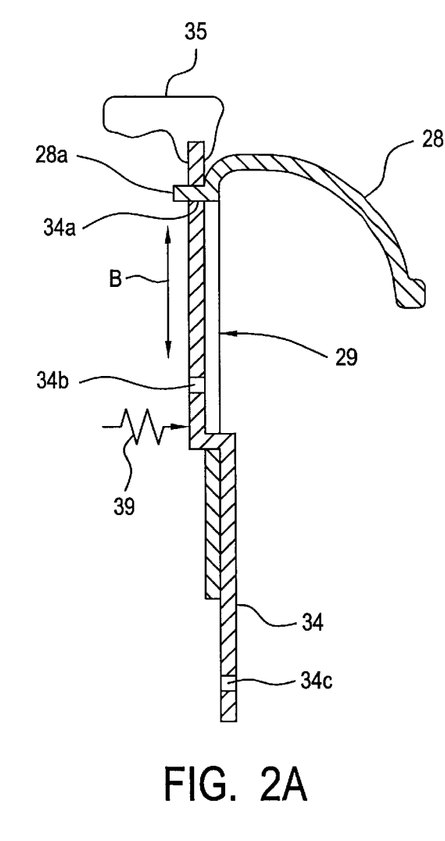
FIG. 2A is a cross-sectional view of a lever used with the lawn edger shown in FIG. 2.

As shown in FIG. 2A, the lever 34 can protrude through an aperture 29 provided in the blade guard 28 in order to connect with the edge guide 32. The lever 34 includes at least a first hole 34a and a second hole 34b that are engagable and lockable with a pin member 28a provided on the blade guard 28. The lever 34 can move along a path indicated by an arrow B so that either the first or second holes 34a or 34b can engage the pin member 28a. Alternatively, the pin member 28a and holes 34a and 34b can be replaced with an arrangement in which the lever 34 is simply clamped in place at a desired position using a clamp-type member. A hole 34c is provided to engage the pin 36 for linking the edge guide 32 to the lever 34.

Figure 2B:
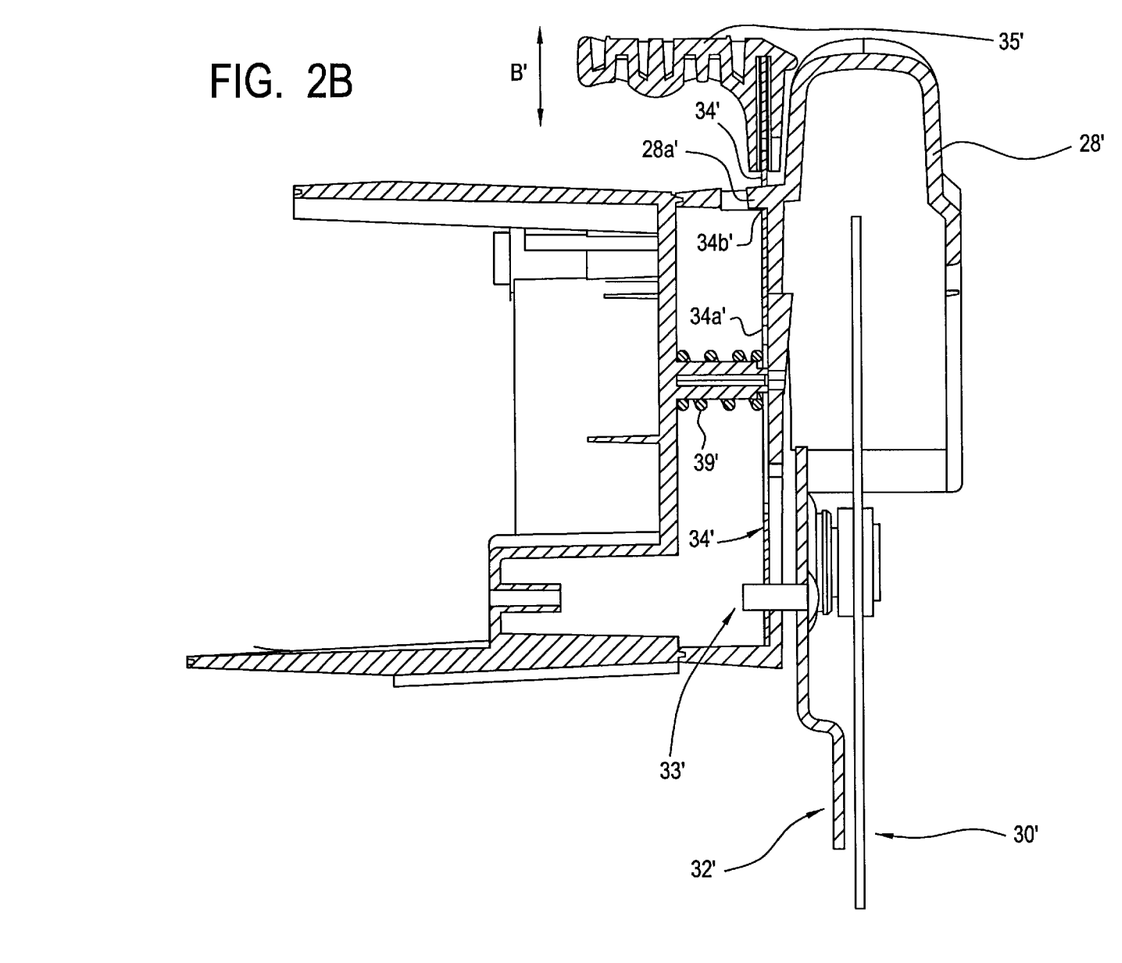
FIG. 2B illustrates an alternative arrangement of the lawn edger shown in FIG. 2A.

FIG. 2B shows another exemplary embodiment of the invention. FIG. 2B shows a configuration of the lawn edger in which a pin 33 is connected to or welded to an edge guide 32' and passes through a slot 29' in a blade guard 28'. The pin 33 further connects to a lever 34' positioned inside the blade guard 28'. A spring 39' can be used to bias the lever 34' such that a pin member 28a' formed on or adjacent the blade guard 28' can engage with either a hole 34a' or 34b' formed in the lever 34' when the lever 34' is moved against the bias of the spring 39' and along the direction indicated by arrow B'. In FIG. 2B, connection between the motor M and the blade 30' and/or the edge guide 32' is also shown for clarity.

Figure 3:
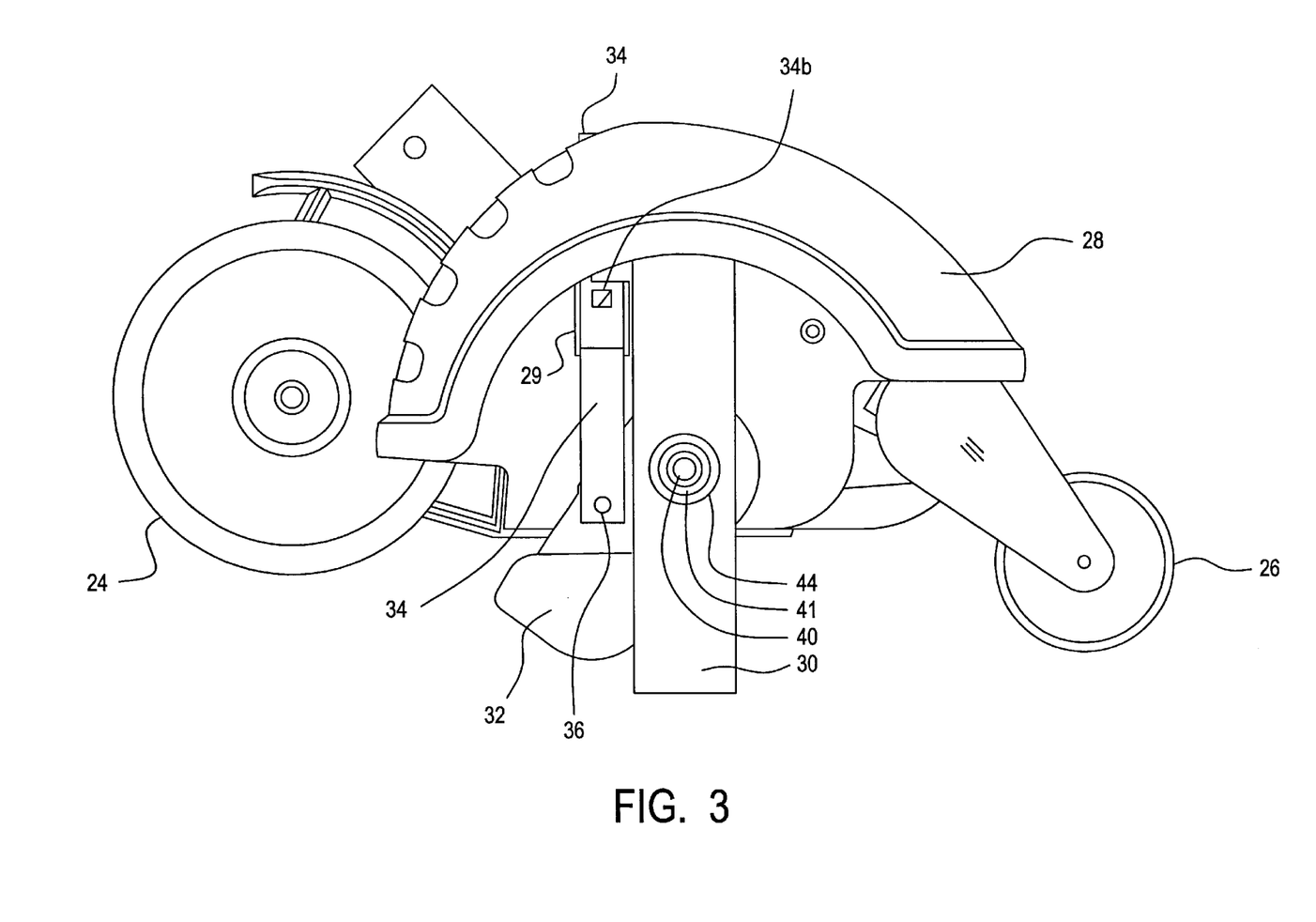
FIG. 3 is a side elevation view of the lawn edger of FIG. 1 having an edge guide in the curb-edging mode.

FIG. 3 shows the lawn edger of FIGS. 1 and 2 with the edge guide 32 in the curb-edging mode. In this mode, the edge guide 32 serves as a physical directional guiding the user along the edge of a curb or other suitable surface. The edge guide 32 also helps prevent the blade from coming into contact with the curb, which could damage the blade. In this position, the first hole 34a is an engagement with the pin member 28a, and the lever 34 is in the retracted position with only a small portion of the lever 34 protruding above the surface of the blade guard 28. The retracted position of the lever 34 indicates that the edge guide 32 is in the curb-edging mode. The position shown in FIG. 3 corresponds to the position shown in FIG. 2A.

Figure 3A:
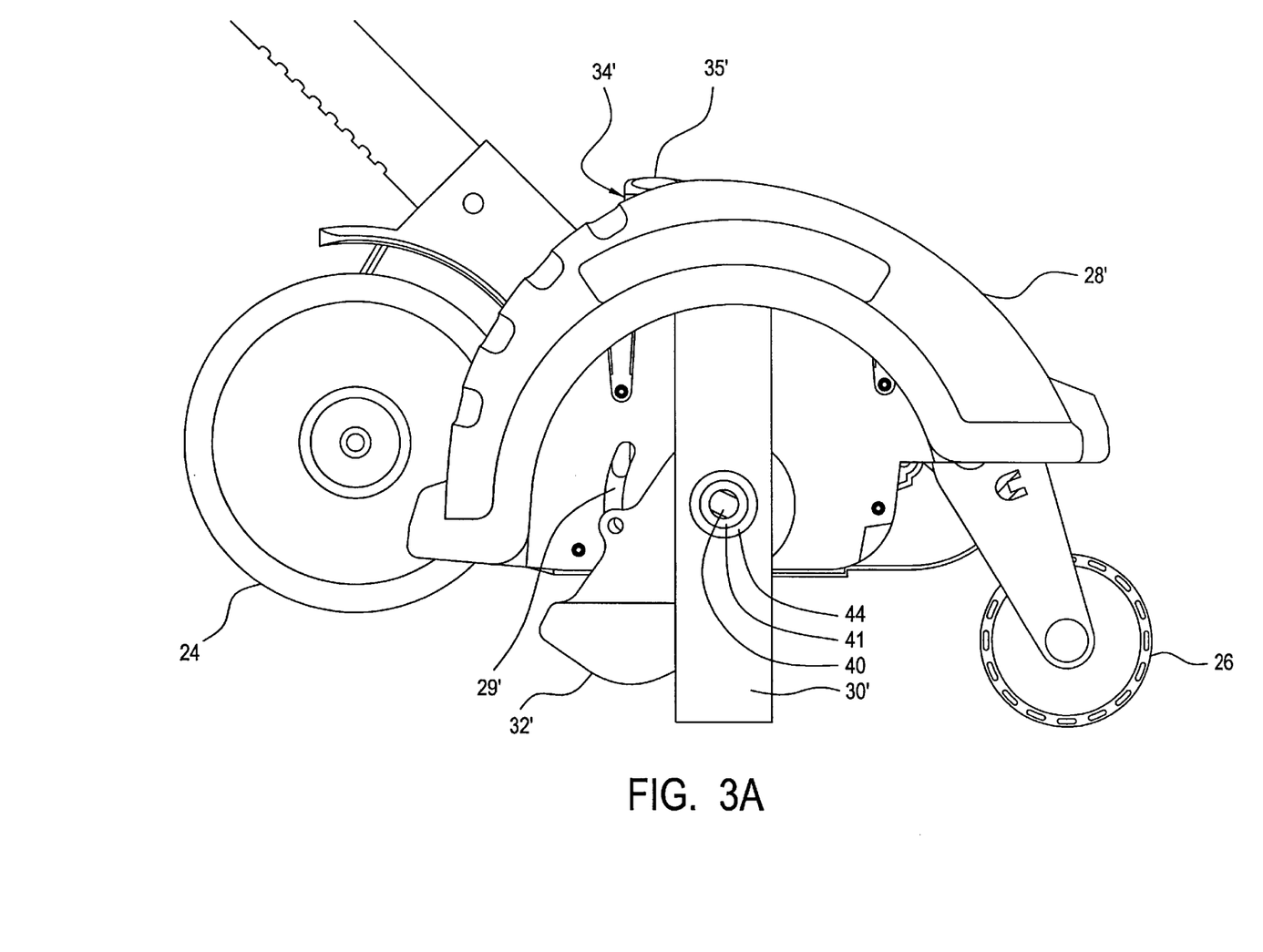
FIG. 3A illustrates an alternative embodiment of the invention corresponding to the lawn edger configuration shown in FIG. 2B.

FIG. 3A shows the lawn edger shown in FIG. 2B, in the curb-edging mode. The pin 33 (not shown for clarity) is welded or otherwise connected to the edge guide 32' and passes directly through the blade guard 28' via slot 29' for connection with the lever 34'. Thus, in contrast to FIG. 3, the lever 34' is positioned behind the blade guard 28'.

Figure 4:
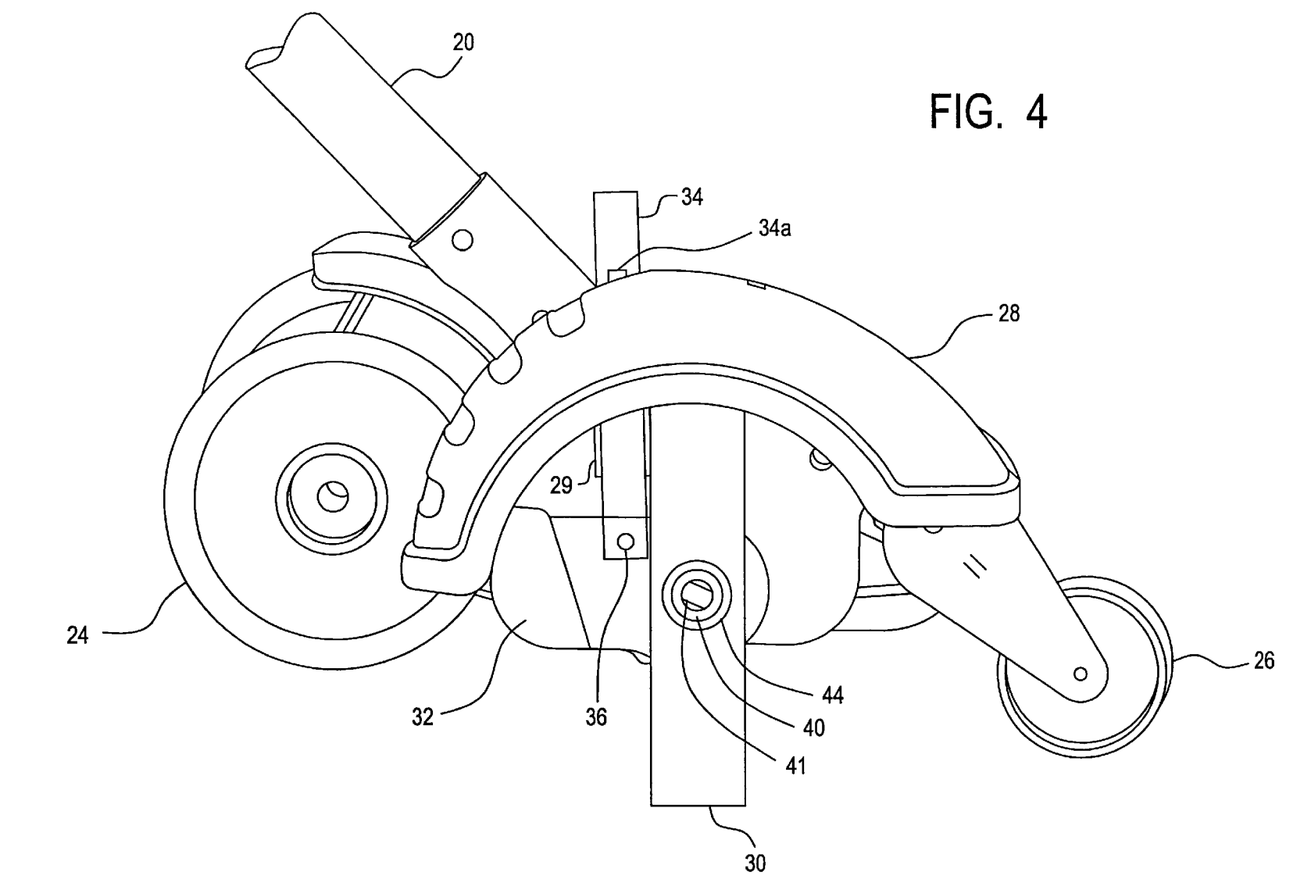
FIG. 4 is a side elevation view of the lawn edger of FIG. 1 having an edge guide in the trench mode.

FIG. 4 shows the lawn edger 10 with the edge guide 32 in the trench mode. In this mode, the second hole 34b of the lever 34 is engaged with the pin member 28a of the blade guard 28. In the trench mode, the edge guide 32 is moved above the ground, which allows the edger to have increased maneuverability for garden bed edging or trenching. Also, the lever 34 assumes an extended position which indicates that the edge guide 32 is in the trench mode. In addition, the position of the lever may provide a visual directional for the user to use as a guide when performing trenching or edging. In another illustrative embodiment not shown, the edge guide 32 and/or the lever 34 may flip up in front of the blade guard 28 to provide a sight-line for the user to follow the desired cutting path. However, the lever 34 and the cutting path defined by the cutting blade 30 need not be aligned and may in fact be offset from one another.

Figure 5:
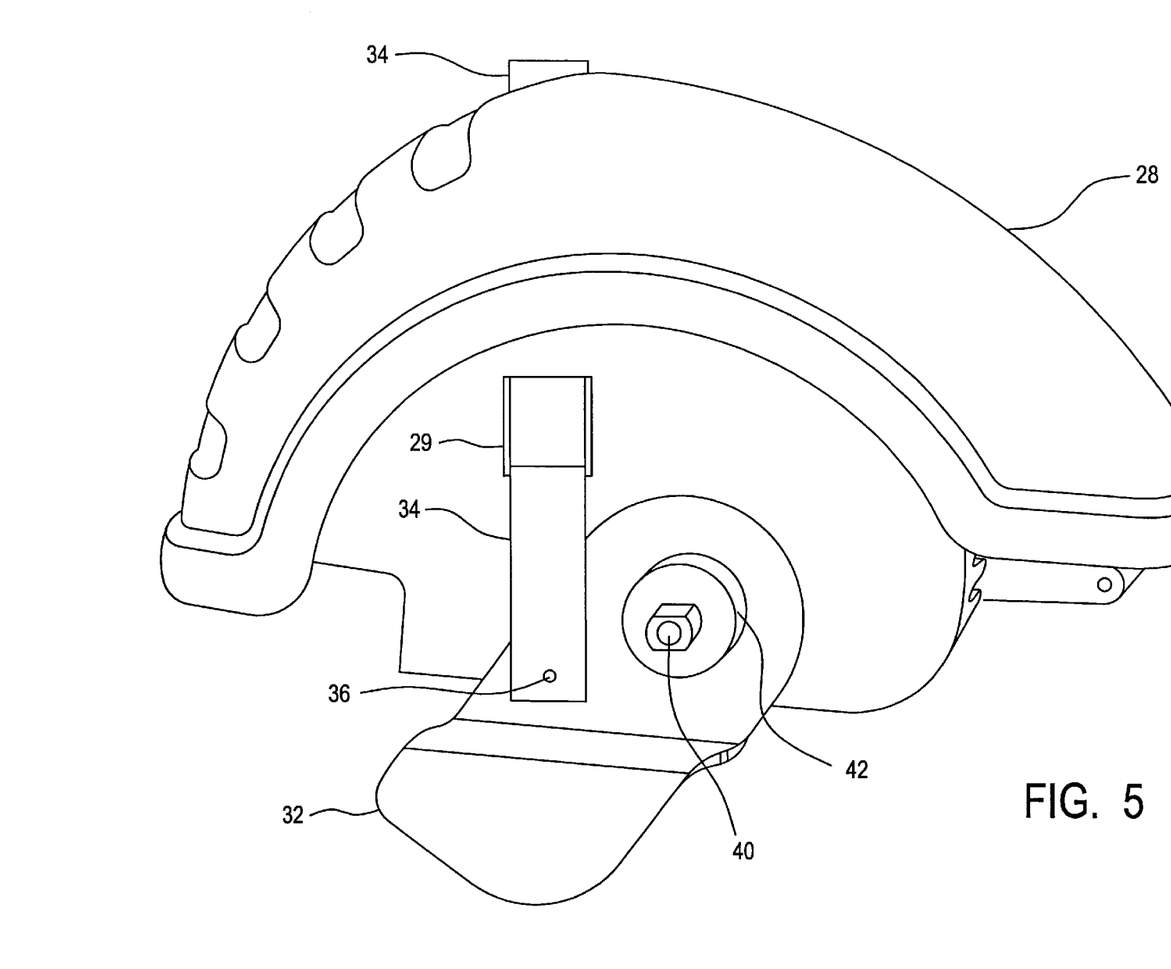
FIG. 5 is a side perspective view of FIG. 1 showing attachment of an edge guide to a spindle boss of a motor.

FIG. 5 shows a schematic perspective view of the blade guard 28 and the edge guide 32 shown in the curb-edging mode. The motor M includes a rotating shaft 40 and a spindle boss 42. The edge guide 32 may be rotatably coupled, for example, to the spindle boss 42, or the edge guide 32 may be rotatably coupled to another portion of a wall surface of the blade guard 28. The spindle boss 42 may include a groove (not shown) to which a C-clip (not shown) can be attached to hold the edge guide 32 in fixed relation to the spindle boss 42. Of course, the edge guide 32 is sized so that it can rotate independently of rotation of the spindle boss 42. The cutting blade 30 is mounted to the rotating shaft 40, which may include threads. As shown in FIGS. 3 and 4, the cutting blade 30 is attached to the rotating shaft using a bolt 41. A washer 44 is also provided between the bolt 41 and the cutting blade 30.

Figure 6:
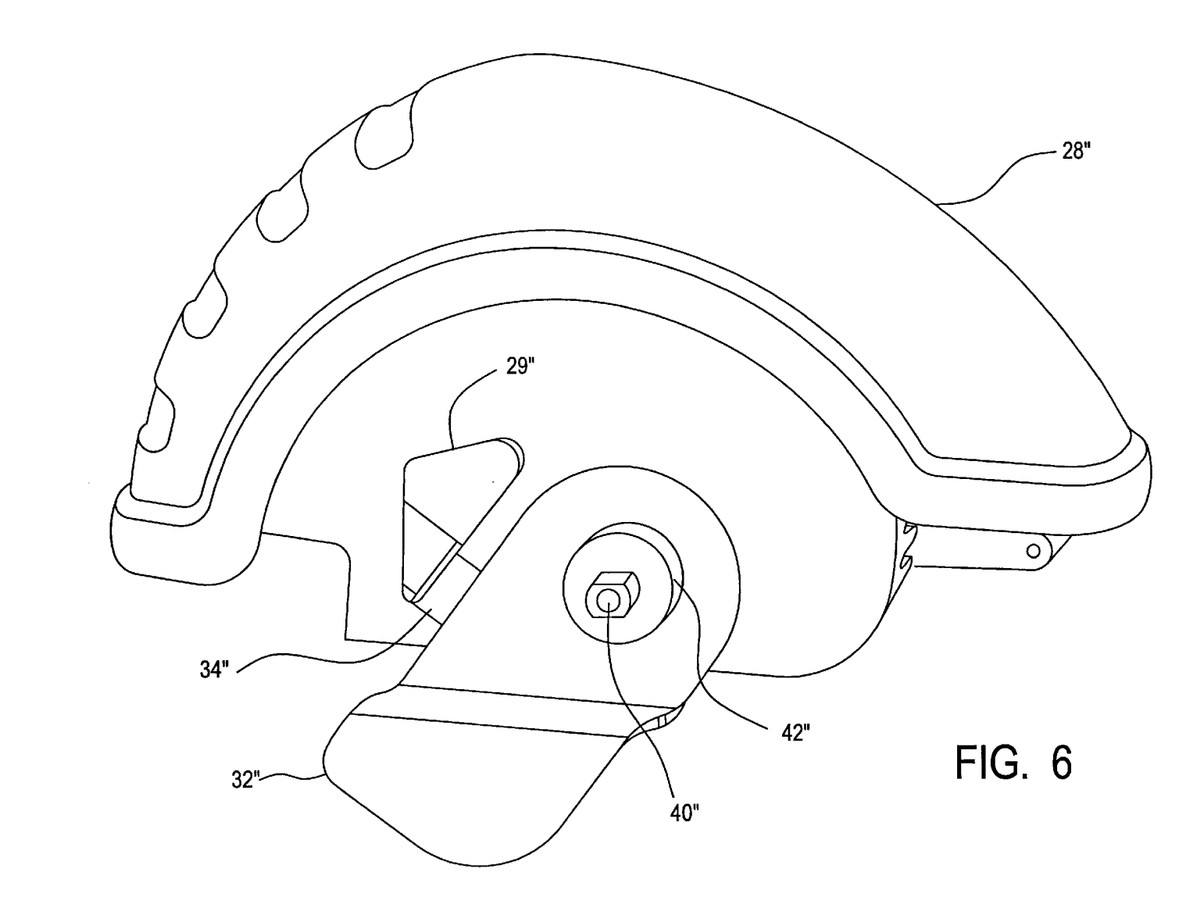
FIG. 6 depicts another exemplary embodiment of a lawn edger according to the present invention.

FIG. 6 shows another exemplary embodiment of the present invention. In this embodiment, a lever 34" is connected to the edge guide 32" and protrudes through an aperture 29" of the blade guard 28". In this exemplary embodiment, the edge guide 32" and the lever 34" can be rigidly fixed to one another, and can even be formed in one piece. A spindle boss 42" and a rotating shaft 40" are similar to the spindle boss 42 and the rotating shaft 40 described above. A user may shift the edge guide 32" between the curb-edging mode and the trench mode by rotating or otherwise manipulating the lever 34".

While this invention has been described in conjunction with exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A lawn edger comprising:
a housing including a motor;
a cutting blade coupled to said motor;
a blade guard positioned to cover at least a portion of the cutting blade;
an edge guide mounted between the housing and the cutting blade, said edge guide being positionable between a curb-edging mode and a trench mode; and
a lever connected to the edge guide and extending through an aperture in the blade guard, the lever being operable to move the edge guide between the curb-edging mode and the trench mode.

2. The lawn edger of claim 1, wherein the motor includes a rotating shaft coupled to the cutting blade and the edge guide.

3. The lawn edger of claim 1, further comprising a spindle boss extending from said motor, said spindle boss rotatably mounting said edge guide and including a rotating shaft coupled to said cutting blade.

4. The lawn edger of claim 1, wherein said blade guard includes a pin member that engages with a first hole of said lever when the edge guide moves into the curb-edging mode and a second hole of the lever when the edge guide moves into the trench mode.

5. The lawn edger of claim 4, further comprising a spring that biases the lever against a side surface of the aperture of the blade guard when the pin member engages the first and second holes of the lever.

6. The lawn edger of claim 1, wherein the lever is movable between a retracted position with respect to the blade guard when the edge guide is in the curb-edging mode and an extended position with respect to the blade guard when the edge guide is in the trench mode.

7. The lawn edger of claim 1, further comprising an elongate tube having a first end connected to the housing and a second end connected to a handle assembly.

8. The lawn edger of claim 7, wherein the handle assembly includes a switch that operates the motor.

9. The lawn edger of claim 7, wherein the handle assembly includes a receptacle adapted to receive an external power source.

10. The lawn edger of claim 1, further comprising at least a pair of wheels mounted adjacent said housing.

11. A lawn edger comprising:
a housing including a motor;
a cutting blade coupled to a rotating shaft extending from a spindle boss of said motor;
an edge guide rotatably mounted on the spindle boss of the motor, said edge guide being movable between a curb-edging mode and a trench mode; and
a lever connected to the edge guide, the lever being operable to move the edge guide between the curb-edging mode and the trench mode.

12. The lawn edger of claim 11, further comprising a blade guard covering at least a radial portion of the cutting blade.

13. The lawn edger of claim 12, wherein the blade guard includes an aperture through which the lever extends, wherein the lever is movable between a retracted position with respect to the blade guard when the edge guide is in the curb-edging mode and an extended position with respect to the blade guard when the edge guide is in the trench mode.

14. The lawn edger of claim 12, wherein said blade guard includes a pin member that engages with a first hole of said lever when the edge guide moves into the curb-edging mode and a second hole of the lever when the edge guide moves into the trench mode.

15. The lawn edger of claim 14, further comprising a spring that biases the lever against a side surface of the aperture of the blade guard when the pin member engages the first and second holes of the lever.

16. A lawn edger comprising:
a housing including a motor;
a cutting blade coupled to a rotating shaft extending from a spindle boss of said motor; and
an edge guide rotatably mounted on the spindle boss of the motor, said edge guide being movable between a curb-edging mode and a trench mode.

17. The lawn edger of claim 16, further comprising a lever articulated to the edge guide, the lever being operable to move the edge guide between the curb-edging mode and the trench mode.

18. The lawn edger of claim 17, further comprising a blade guard covering at least a portion of the cutting blade, wherein the blade guard includes an aperture through which the lever extends, wherein the lever is movable between a retracted position with respect to the blade guard when the edge guide is in the curb-edging mode and an extended position with respect to the blade guard when the edge guide is in the trench mode.

19. The lawn edger of claim 18, wherein said blade guard includes a pin member that engages with a first hole of said lever when the edge guide moves into the curb-edging mode and a second hole of the lever when the edge guide moves into the trench mode.

20. The lawn edger of claim 19, further comprising a spring that biases the lever against a side surface of the aperture of the blade guard when the pin member engages the first and second holes of the lever.

* * * * *